(12) United States Patent
Prabhu et al.

(10) Patent No.: US 12,478,943 B1
(45) Date of Patent: Nov. 25, 2025

(54) GRADUAL OXIDATION APPARATUS

(71) Applicant: Edan Prabhu, Mission Viejo, CA (US)

(72) Inventors: Edan Prabhu, Mission Viejo, CA (US); João Robinson Huang, Monrovia, CA (US)

(*) Notice: Subject to any disclaimer, the term of this patent is extended or adjusted under 35 U.S.C. 154(b) by 0 days.

(21) Appl. No.: 19/059,008

(22) Filed: Feb. 20, 2025

(51) Int. Cl.
*B01J 19/02* (2006.01)
*B01J 19/24* (2006.01)

(52) U.S. Cl.
CPC .............. *B01J 19/02* (2013.01); *B01J 19/243* (2013.01); *B01J 2219/00076* (2013.01); *B01J 2219/0263* (2013.01); *B01J 2219/0277* (2013.01)

(58) Field of Classification Search
CPC ... B01J 19/00; B01J 19/02; B01J 19/24; B01J 19/2415; B01J 19/243; B01J 2219/00; B01J 2219/00049; B01J 2219/00051; B01J 2219/00074; B01J 2219/00076; B01J 2219/02; B01J 2219/025; B01J 2219/0263; B01J 2219/0277
See application file for complete search history.

(56) References Cited

U.S. PATENT DOCUMENTS 9,353,946 B2 * 5/2016 Hamrin ................. F23G 7/066

* cited by examiner

*Primary Examiner* — Natasha E Young
(74) *Attorney, Agent, or Firm* — CIONCA IP Law P.C.

(57) ABSTRACT

An oxidation apparatus configured to receive a gas stream, the oxidation apparatus having: an apparatus inlet port; a heat exchanger in fluid communication with the apparatus inlet port, the heat exchanger having: a cold gas channel in fluid communication with the apparatus inlet port; and a hot gas channel in thermal communication with the cold gas channel; a reactor inlet port in fluid communication with the cold gas channel; a reactor body in fluid communication with the reactor inlet port; a reactor outlet port in fluid communication with the reactor body and the hot gas channel; and an apparatus outlet port in fluid communication with the hot gas channel. The reactor body is configured to continuously oxidize fuel gas within the gas stream, such that gas travelling through the hot gas channel heats gas travelling through the cold gas channel, preheating the gas stream prior to entering the reactor body.

18 Claims, 10 Drawing Sheets

GRADUAL OXIDATION APPARATUS

BACKGROUND OF INVENTION

1. Field of the Invention

The invention relates generally to oxidation apparatuses and specifically to gradual oxidation apparatuses configured to oxidize methane without a catalyst.

2. Description of the Related Art

Methane is one of the most stable hydrocarbons, and is therefore difficult to oxidize. Methane is also a potent greenhouse gas, emitted naturally from wetlands and also from coal mines, oil and gas production. However, when methane is able to be combusted, it is an excellent fuel. It has a calorific value of 55 MJ/kg, which is 23,000 Bru/lb. The final products of methane oxidation/combustion are water and carbon dioxide, wherein several intermediate hydrocarbons may be formed prior to full oxidation.

As is understood, methane is capable of being combusted to generate heat. In order to achieve continuous combustion, an incoming gas stream commonly requires a high concentration of methane. In said embodiments, the methane gas enters a stream of a carrier gas, such as air (or other oxygen-containing gas), and is ignited by a spark, glow plug or other high temperature source that is above 1000 degrees C. Once the methane ignites, it may reach a local temperature well above 1000 degrees C. Additionally, this oxidation reaction is turbulent, because the released heat causes the combusting gases to expand rapidly. The expansion and turbulence cause this combusting gas to mix with non-combusted gas, setting up a chain reaction, wherein local zones may reach 2000 C or higher. At this elevated temperature, nitrogen in the mixture could react with oxygen to form nitrogen oxidizes, which are harmful to human health.

Many sources of methane seeping into the atmosphere are not sufficiently concentrated to be able to achieve combustion through the above-described mechanism. It is generally accepted that combusting methane in concentrations below 4% is not possible (e.g., the combustible range for methane gas has a lower limit of 4% concentration). In some instances, waste gases are flared or combusted, rather than released into the atmosphere, to reduce harmful chemicals contained in those gases, in a process known as flaring. When the methane gas concentration drops below 4%, flares are hard to maintain, and supplemental fuel gas must be added to sustain the flare. Doing so results in even more emissions and loss of fuel gas that could be used for other purposes.

Another issue with methane oxidation is that methane has strong chemical bonds that are not easy to break down. Intermediate products generated from methane oxidation may include methanol, formaldehyde, formic acid, and carbon monoxide. While methane oxidation does occur at atmospheric temperatures, this oxidation process may take several years without external intervention. As the temperature increases, the rate of methane oxidation also increases accordingly. For methane oxidation, there are two generally accepted stages. The first stage is known as the "Induction Stage", wherein the rate of oxidation is slow, and when some of the breakdown/intermediate species are being formed. The second stage is the "rapid oxidation stage", also known as the "stable stage", during which partially oxidized gases oxidize more rapidly.

There have been several attempts to combust or oxidize weak gases, including heat-soaking media that are maintained at high temperature, and use of catalysts that can reduce the temperature needed for methane oxidation. While catalysts for methane are still in development, in general, the use of catalysts may be undesirable. Many catalysts are made from expensive noble metals and must be deposited on substrates in very thin layers on complex substrates making them very expensive. Catalytic reactions rely on very high surface area, and the surface of the catalyst may be coated or changed over time, reducing its effectiveness. The only means available to oxidize concentrations of methane below 1.0% in air is known as a regenerative thermal oxidizer or RTO. An RTO is a large vessel filled with ceramic blocks, shells or pebbles. The RTO oxidizes methane, rather than combusting it. For oxidation, the RTO vessel is heated to about 800 C, and gases are passed through the vessel. The heating of the RTO is commonly achieved by combustion of an external gas (e.g., not the methane the RTO is configured to oxidize). The gas heats up as it travels through the hot ceramic and oxidizes, increasing its temperature and heating the ceramic at the outlet of the RTO. However, the inlet of the ceramic bed cools as it gives its heat to the incoming cold gas. After a few minutes, flow through the RTO has to be reversed, such that the cold gas entering the RTO is heated by the hottest ceramic tiles. Additionally, RTOs are large and bulky, and the constant need for flow reversal uses large poppet valves that are difficult to maintain. In general, it is difficult to control the flow of gas in a large vessel, which negatively influences RTO operation. Furthermore, over time, the hot ceramic can move around, and even crumble, more so because ceramic temperatures keep fluctuating as flows reverse every few minutes.

Therefore, there is a need to solve the problems described above by proving a device and method for oxidation of a gas stream having a low fuel gas concentration using a compact apparatus without the use of catalysts.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, an oxidation apparatus configured to receive a gas stream having a fuel gas mixed with a carrier gas, the carrier gas comprising oxygen, wherein the concentration of the fuel gas in the gas stream is below a combustible range is provided, the oxidation apparatus comprising: an apparatus inlet port configured to receive the gas stream; a heat exchanger in fluid communication with the apparatus inlet port, the heat exchanger comprising: a cold gas channel in fluid communication with the apparatus inlet port; and a hot gas channel in thermal communication with the cold gas channel; a reactor inlet port in fluid communication with the cold gas channel; a variable area reactor body in fluid communication with the reactor inlet port, the variable area reactor body comprising: a first expanding flow area portion in fluid communication with the reactor inlet port; a reactor channel with a large flow area in fluid communication with the first expanding flow area portion; and a second decreasing flow area portion in fluid communication with the reactor channel; a reactor outlet port in fluid communication with the second decreasing flow area portion; a soaker channel in fluid communication with the reactor outlet port and the hot gas channel; and an apparatus outlet port in fluid communication with the hot gas channel, wherein the apparatus outlet port is configured to emit the gas stream from the oxidation apparatus; wherein the oxidation apparatus is configured to provide the gas stream with heating to achieve gradual oxidation of the fuel gas, whereby the gradual oxidation of the fuel gas raises the temperature of the gas stream, thus increasing the oxidation rate of the fuel gas and further increasing the temperature of the gas stream; such that heat is transferred from higher temperature gas travelling through the hot gas channel to lower temperature gas travelling through the cold gas channel, raising the temperature of the lower temperature gas travelling through the cold gas channel to initiate and maintain gradual oxidation of the fuel gas, to facilitate substantial oxidation of the fuel gas of the gas stream within the oxidation apparatus. Thus, an advantage is that the oxidation apparatus is configured to continuously oxidize the fuel gas in the gas stream without needing to alter the flow direction of the gas stream, as a result of corresponding portions of the oxidation apparatus remaining at a more constant temperature during steady state operation. Another advantage is that the operating principles of the oxidation apparatus allow it to be compact, as no large vessels are required to facilitate proper mixing, oxidation or heat exchange. Another advantage is that the variable area reactor body may be provided in a variety of different shapes and materials depending on the needs of the oxidation operation. Another advantage is that the oxidation apparatus is configured to utilize additional structures to facilitate improved oxidation, such as flow diverters nested within the reactor body and the soaker channel, wherein the flow diverters are configured to provide improved mixing within the variable area reactor body, and the soaker channel is configured to increase the amount of time the gas stream remains at a higher temperature before reentering the heat exchanger.

In another aspect, an oxidation apparatus configured to receive a continuous gas stream having a fuel gas mixed with a carrier gas, the carrier gas comprising oxygen, wherein the concentration of the fuel gas in the continuous gas stream is below a combustible range is provided, the oxidation apparatus comprising: an apparatus inlet port configured to receive the continuous gas stream; a heat exchanger in fluid communication with the apparatus inlet port, the heat exchanger comprising: a cold gas channel in fluid communication with the apparatus inlet port; and a hot gas channel in thermal communication with the cold gas channel; a reactor inlet port in fluid communication with the cold gas channel; a reactor body in fluid communication with the reactor inlet port; a reactor outlet port in fluid communication with the reactor body and the hot gas channel of the heat exchanger; and an apparatus outlet port in fluid communication with the hot gas channel, wherein the apparatus outlet port is configured to emit the continuous gas stream from the oxidation apparatus; wherein the oxidation apparatus is configured to provide the continuous gas stream with heating to achieve gradual oxidation of the fuel gas, whereby the gradual oxidation of the fuel gas raises the temperature of the continuous gas stream, thus increasing the oxidation rate of the fuel gas and further increasing the temperature of the continuous gas stream; such that heat is transferred from higher temperature gas travelling through the hot gas channel to lower temperature gas travelling through the cold gas channel, raising the temperature of the lower temperature gas travelling through the cold gas channel to initiate and maintain gradual oxidation of the fuel gas, to facilitate substantial oxidation of the fuel gas of the continuous gas stream within the oxidation apparatus. Again, an advantage is that the oxidation apparatus is configured to continuously oxidize the fuel gas in the gas stream without needing to alter the flow direction of the gas stream, as a result of corresponding portions of the oxidation apparatus remaining at a more constant temperature during steady state operation. Another advantage is that the operating principles of the oxidation apparatus allow it to be compact, as no large vessels are required to facilitate proper mixing, oxidation or heat exchange. Another advantage is that the reactor body may be provided in a variety of different shapes and materials depending on the needs of the oxidation operation. For example, for applications requiring a reactor body that is expandable and flexible and thus configured to absorb the stresses caused by uneven temperatures, expansion, dissimilar materials and creep, a serpentine reactor body constructed from stainless steel may be used. Another advantage is that the oxidation apparatus is configured to utilize additional structures to facilitate improved oxidation, such as flow diverters nested within the reactor body and a soaker channel, wherein the flow diverters are configured to provide improved mixing within the reactor body, and the soaker channel is configured to increase the amount of time the gas stream remains at a higher temperature.

In another aspect, an oxidation apparatus configured to receive an input gas stream and emit an output gas stream, the input gas stream having a fuel gas mixed with a carrier gas, the carrier gas comprising oxygen, wherein the concentration of fuel gas within the input gas stream is below a combustible range is provided, the oxidation apparatus comprising: a heat exchanger configured to receive the input gas stream and transfer heat from the output gas stream to the input gas stream to raise the temperature of the input gas stream; a reactor body in fluid communication with the heat exchanger, wherein the reactor body is configured receive the input gas stream from the heat exchanger, substantially oxidize the fuel gas within the input gas stream to form the output gas stream and emit the output gas stream to the heat exchanger; wherein the oxidation apparatus is configured to provide the input gas stream with heating to achieve gradual oxidation of the fuel gas, whereby the gradual oxidation of the fuel gas raises the temperature of the input gas stream, thus increasing the oxidation rate and increasing the temperature of the input gas stream within the oxidation apparatus to initiate and maintain gradual oxidation of the fuel gas, to facilitate substantial oxidation of the fuel gas within the oxidation apparatus. Again, an advantage is that the oxidation apparatus is configured to continuously oxidize the fuel gas in the input gas stream without needing to alter the flow direction of the gas stream, as a result of corresponding portions of the oxidation apparatus remaining at a more constant temperature during steady state operation. Another advantage is that the operating principles of the oxidation apparatus allow it to be compact, as no large vessels are required to facilitate proper mixing, oxidation or heat exchange. Another advantage is that the reactor body may be provided in a variety of different shapes and materials depending on the needs of the oxidation operation. For example, for applications requiring a reactor body that is expandable and flexible and thus configured to absorb the stresses caused by uneven temperatures, expansion, dissimilar materials and creep, a serpentine reactor body constructed from stainless steel may be used. Another advantage is that the oxidation apparatus is configured to utilize additional structures to facilitate improved oxidation, such as flow diverters nested within the reactor body and a soaker channel, wherein the flow diverters are configured to provide improved mixing within the reactor body, and the soaker channel is configured to increase the amount of time the gas stream remains at a higher temperature.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
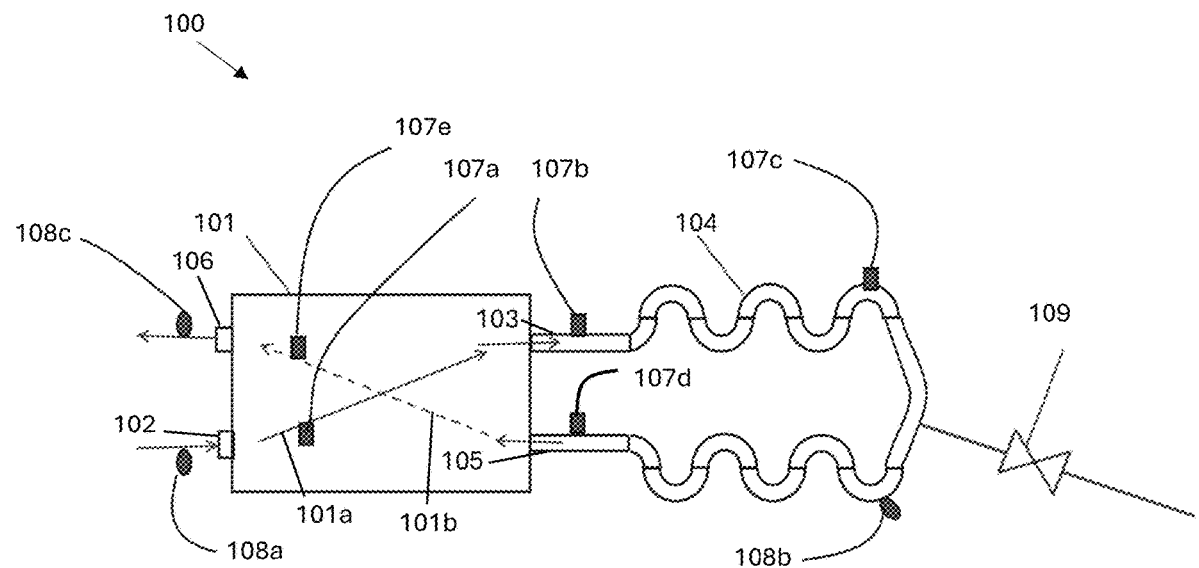
FIG. 1 illustrates a schematic of an embodiment of a gradual oxidation apparatus having a serpentine reactor body, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 101 and 401, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 illustrates a schematic of an embodiment of a gradual oxidation apparatus ("oxidation apparatus") 100 having a serpentine reactor body 104, according to an aspect. The disclosed gradual oxidation apparatus 100 may be configured to receive a dilute stream of methane (or another combustible fuel gas, such as hydrogen, carbon monoxide, ammonia, etc.) and oxidize said methane to generate heat for a continuous methane oxidation reaction. In an embodiment, the gradual oxidation apparatus 100 may comprise an apparatus inlet port 102, a heat exchanger 101 in fluid communication with the apparatus inlet port 102, a reactor inlet port 103 in fluid communication with the apparatus inlet port 102, a reactor body 104 in fluid communication with the reactor inlet port 103, a reactor outlet port 105 in fluid communication with the reactor body 104 and the heat exchanger 101, and an apparatus outlet port 106 in fluid communication with the heat exchanger 101. In an embodiment, the gradual oxidation apparatus 100 may further comprise a valve 109 in fluid communication with the reactor body 104, wherein the valve 109 is configured to be in fluid communication with a separate, supplemental source of fuel gas or other heat, such that the valve 109 may be selectively opened to provide the fuel gas that is combusted within the reactor body 104 to preheat the reactor body 104 to start the continuous methane oxidation reaction.

In an embodiment, a continuously flowing gas stream ("continuous gas stream", "gas stream") having a dilute methane mixture in air (which is largely oxygen and nitrogen gas) may be fed into the gradual oxidation apparatus 100 through the apparatus inlet port 102. Upon entering the apparatus inlet port 102, the gas stream may enter the heat exchanger 101, traveling through a cold gas channel 101a of the heat exchanger 101 to a reactor inlet port 103. As will be discussed in greater detail below, the gas stream travelling through the cold gas channel 101a may be configured to be heated by an exhaust gas stream travelling through a hot gas channel 101b of the heat exchanger 101, to efficiently utilize heat generated within the reactor body 104.

After entering the reactor inlet port 103, the gas stream may travel through the reactor body 104, wherein the methane within the preheated gas stream is allowed to react/oxidize as it travels through the reactor body 104, thus increasing the temperature of the gas stream as it travels through the length of the reactor body 104. In an embodiment, the gradual oxidation apparatus 100 is configured such that the methane (or other fuel gas) within the gas stream traveling through the gradual oxidation apparatus 100 undergoes gradual oxidation, such that the methane is substantially oxidized (at least 99% oxidized) prior to exiting the gradual oxidation apparatus 100 through the apparatus outlet port 106. In an alternative embodiment, as a result of the particular configuration/shape of the reactor body 104, the methane within the gas stream may be substantially oxidized prior to reaching the reactor outlet port 105. As is understood, the oxidation of the methane within the gas stream (e.g., the oxidation of the gas stream) is configured to produce carbon dioxide and water vapor. The exothermic nature of the methane oxidation reaction occurring within the reactor body 104 results in the gas stream leaving the reactor body 104 through the reactor outlet port 105 at a higher temperature than the gas stream entering the reactor body 104 though the reactor inlet port 103.

The heated gas stream leaving the reactor body 104 through the reactor outlet port 105 may travel through the hot gas channel 101b of the heat exchanger and exit the heat exchanger 101 through a corresponding apparatus outlet port 106. In an embodiment, the hot gas channel 101b of the heat exchanger 101 may be in thermal communication with the cold gas channel 101a of the heat exchanger 101, such that the higher temperature gas ("high temperature gas") travelling through the hot gas channel 101b is configured to heat the lower temperature gas ("low temperature gas") travelling through the cold gas channel 101a. For clarity, it should be understood that the higher/high temperature gas has a greater temperature than the lower/low temperature gas, thus allowing heat to be transferred from the higher temperature gas to the lower temperature gas. This heat exchange between the cold gas channel 101a and hot gas channel 101b is configured to facilitate the preheating of the fresh air-methane mixture being fed into the gradual oxidation apparatus 100 through the apparatus inlet port 102, thus facilitating the continuous oxidation of methane within the gradual oxidation apparatus 100. In an embodiment, the gas stream exiting the apparatus outlet port 106 will be mostly nitrogen and oxygen, with a fraction of the oxygen used in the reaction (e.g., less oxygen is present in the gas stream exiting the apparatus outlet port 106 than the gas stream entering the apparatus inlet port 102, due to oxygen consumption during oxidation). For simplicity, the cold gas channel 101a (and flow of the cooler, unoxidized gas stream) may be represented by the solid arrow shown in FIG. 1, whereas the hot gas channel 101b (and flow of the hotter, oxidized exhaust gas stream) may be represented by the dotted arrow shown in FIG. 1.

In an embodiment, the disclosed reactor body 104 may be "serpentine" in shape, as shown in FIG. 1. This serpentine shape has a plurality of smooth, alternating bends/curves configured to provide a longer gas flow pathway within the reactor body 104, while minimizing the overall dimensions of the reactor body 104 (e.g., by having the reactor pathway that is serpentine as shown in FIG. 1, the reactor body may have a lesser length than a straight pipe reactor with the same residence time). In an embodiment, this serpentine shape of the reactor body 104 may be configured to increase the residence time of the gas stream within the reactor body 104 while providing sufficient mixing for the gas stream, thus ensuring that substantial oxidation of methane is possible prior to leaving the reactor body 104 through the reactor outlet port 105. It should be understood that alternative configurations of the reactor body 104 may be utilized in order to ensure methane within the gas stream has sufficient residence time within the reactor body 104 to be substantially oxidized and mixed, as will be discussed in greater detail in FIG. 3A-3D.

The term "sufficient residence time" should be understood to indicate a duration of time in which the particular fuel gas can be substantially oxidized within the gradual oxidation apparatus 100 prior to being emitted from the gradual oxidation apparatus, at the particular operating conditions (temperature, gas stream flow rate, pressure, etc.) As is understood the amount of residence time the gas stream has within the gradual oxidation apparatus 100 will be dependent upon a variety of factors, including the flow rate of the gas stream, the length and cross-sectional area of the reactor body, the presence of additional structures within the gradual oxidation apparatus, amongst other factors.

In an embodiment, the gradual oxidation apparatus 100 may further comprise a plurality of sensors or monitoring devices configured to measure operating conditions at relevant portions of the gradual oxidation apparatus 100 to ensure proper system operation. For example, the disclosed gradual oxidation apparatus 100 may further comprise a plurality of temperature monitoring devices 107a-107e and a plurality of pressure monitoring devices 108a-108c associated with corresponding portions of the gradual oxidation apparatus 100. In an embodiment, a user may modify apparatus flow parameters, such as the flow rate of the gas stream, valve actuation, etc., depending on how the temperature and pressure conditions at particular portions of the gradual oxidation apparatus 100 deviate from their desired values.

In an embodiment, such as the gradual oxidation apparatus of FIG. 1, a first temperature monitoring device 107a may be associated with the cold gas channel 101a of the heat exchanger 101, a second temperature monitoring device 107b associated with the reactor inlet port 103, a third temperature monitoring device 107c associated with the reactor body 104, a fourth temperature monitoring device 107d associated with the reactor outlet port 105 and a fifth temperature monitoring device 107e associated with the hot gas channel 101b of the heat exchanger 101. In said embodiment, the third temperature monitoring device 107c may be associated with the reactor body 104 such that the third temperature 107c monitoring device measures the temperature of the gas stream after said gas stream enters the reactor body 104 from the reactor inlet port 103 but before the gas stream passes the valve 109 associated with the reactor body 104. The temperature monitoring devices 107a-107e are configured to assist in determining the oxidation rate and the state of the oxidation reaction and can be used to assist in controlling the reaction rate and temperature.

In an embodiment, such as the gradual oxidation apparatus of FIG. 1, a first pressure monitoring device 108a may be associated with the apparatus inlet port 102, a second pressure monitoring device 108b may be associated with the reactor body 104, and a third pressure monitoring device 108c may be associated with the apparatus outlet port 106. In said embodiment, the second pressure monitoring device 108b may be associated with the reactor body 104 such that the second pressure monitoring device 108b measures the pressure of the gas stream after the gas stream passes by the valve 109, but before said gas stream passes into the reactor outlet port 105. In an embodiment, the pressure monitors may be used to assess the degree of obstructions that may build up during operation, and also to monitor changes in flow rate of the gas.

It should be noted that the formation of the intermediate products from methane oxidation is exothermic. As the reaction proceeds, the temperature of the mixture increases. As the temperature increases, the rate of reaction increases. At the same time, there are other changes taking place. The gas within the gas stream is expanding as it is heated, and the chemical reactions change the density of their components. In an embodiment, the reactor body 104 is configured to expand to compensate for the temperature and density changes in the gas stream. These factors must be considered when computing the required residence time within the reactor body 104 for the methane within the gas stream to be substantially oxidized. In an embodiment, the reactor body 104 may be flexible and can therefore absorb some of the stresses and distortion from the temperature changes, expansion and distortion. A flexible reactor body 104 may be constructed from stainless steel, or another suitable durable but flexible material, which naturally expands as it is heated.

As is understood, in an embodiment, the disclosed gradual oxidation apparatus 100 is configured to oxidize a continuous, one-way gas steam of dilute methane, without needing to reverse the flow direction. Furthermore, the mechanisms utilized for heating within the gradual oxidation apparatus 100 may avoid significant temperature fluctuations/constant temperature changes within the apparatus during operation, as external heat transfer mediums, such as ceramic shells, are not utilized therein. Furthermore, the disclosed gradual oxidation apparatus 100 may be configured to utilize a compact, highly efficient high temperature heat exchanger 101, and thus may be configured to facilitate suitable heat transfer between the gas streams present before and after the reactor body 104 without the use of large vessels.

Depending on the specific needs of an oxidation application, the specifications of the gradual oxidation apparatus 100 may be modified accordingly. For example, the internal cross-sectional area (which may also be described as the "flow area") of the piping utilized within the oxidation apparatus 100, including the reactor body 104, may be increased in order to decrease flow velocity and thus increase residence time within the oxidation apparatus 100 (or a particular portion of the oxidation apparatus 100, such as the reactor body 104, accordingly), to ensure the gas stream is provided with sufficient residence time within the gradual oxidation apparatus 100 to achieve substantial oxidation of the fuel gas. An embodiment of this variable area reactor body may be seen in FIGS. 4A-4C. As mentioned above, the reactor body, such as the serpentine reactor body of FIG. 1, may be designed to be flexible, depending on the specific materials used in its fabrication, thus absorbing stress caused by uneven temperatures, expansion of gases, dissimilar materials and creep. As will be described hereinbelow, the reactor body may utilize alternative designs, as well as supplemental structures, such as flow diverters ("diverters") 313 nested within the reactor body 304 of FIG. 3A, in order to achieve the necessary flow parameters (including sufficient residence time of the gas stream within the reactor body) to ensure substantial oxidation of the hydrocarbons within the gas stream. Furthermore, it should be understood that the disclosed gradual oxidation apparatus 100 may include modular add-ons configured to provide more residence time within the reactor body for the oxidation of the gas stream, replaceable sections/portions for sections of the apparatus 100 that are subject to erosion, wear or other damage, as well as replaceable sections for heating/preheating the reactor body 104 and other pertinent structures to ensure substantial oxidation of methane, hydrocarbons or other fuel gases present within the gas stream prior to leaving the gradual oxidation apparatus 100. While the gradual oxidation apparatuses disclosed herein may generally be described being used for oxidation of a dilute methane steam (e.g., 0.5% methane in a stream of air) it should be understood that the gradual oxidation apparatus 100 may be customized or otherwise adapted to oxidize different concentrations and compositions, as needed.

The disclosed gradual oxidation apparatus 100 may also be customized to oxidize any other fuel gas, such as hydrogen, ammonia, propane, combinations of gases and even liquids. In an embodiment, the fuel gas within the continuous gas stream that is fed into to the gradual oxidation apparatus 100 could be waste gas from a separate process, such as exhaust from a turbine or engine/reciprocating engine (such as lean burn engines), emissions from a chemical, industrial and/or fuel process, as well as byproducts from other processes, wherein the waste gas contains small amounts of hydrocarbons that may include methane, carbon monoxide or other oxidizable gases. In said instances, the fuel gas may be referred to as a waste gas, wherein the waste gas comprises residual oxidizable gases generated as the byproducts for these separate processes. All these gases oxidize more rapidly as the temperature increases. Methane is the most stable hydrocarbon gas, and the most difficult to oxidize. Therefore, if methane can be oxidized within the disclosed gradual oxidation apparatus, most other fuel gases can also be oxidized under the same (or less extreme) conditions.

In an embodiment, the fuel gas content of the waste gas in the continuous gas stream may not be sufficient to raise the temperature of the continuous gas stream to where the oxidation reaction sustains itself. In such instances, after heating the reactor body, it may be necessary to add small amounts of additional fuel gas or additional heating to maintain the necessary temperatures within the gradual oxidation apparatus 100 to sustain the continuous oxidation reaction. The controlling of this additional fuel gas/additional heating may also be useful for controlling the operation of the gradual oxidation apparatus 100. In other words, should the fuel content in the waste gas be insufficient to maintain the temperatures needed for gradual oxidation of the fuel in the waste gas, a small amount of additional/supplemental fuel gas, such as natural gas, or other form of heat, such as electric heat, may be added to the waste gas to achieve and sustain such gradual oxidation. The flow of this additional/supplemental fuel gas may be controlled with a valve or other device, such that the oxidizing apparatus stays within the temperatures needed for substantial gradual oxidation of fuel gas from the entering mixture/the incoming continuous gas stream.

It should be understood that the gas stream may be described in various ways in order to articulate which elements of the gradual oxidation apparatus 100 that it has already traveled through or the current state/composition of the gas stream. For example, in an embodiment wherein the gas steam achieves substantial oxidation within the reactor body 104, the continuous gas stream may be described as an "input gas stream" or "unoxidized gas stream" from when it enters the gradual oxidation apparatus 100 until it travels through and is substantially oxidized within the reactor body 104, at which point the continuous gas stream may be referred to as an "output gas stream", "exhaust gas steam" or "oxidized gas stream". It should also be understood that infinitesimal amounts of oxidation of fuel gases occur naturally at room temperature, but the heat generated from such infinitesimal amounts of oxidation is insufficient to raise the temperature of the gases sufficiently to promote gradual oxidation, and thus additional heat may be required to initiate a self-sustaining oxidation reaction capable of continually oxidizing the incoming fuel gas within the input gas stream.

It should be understood that while the continuous gas stream received by the gradual oxidation apparatus 100 (e.g., the gas stream entering the apparatus inlet port 102) may have a fuel gas concentration below the corresponding combustible range for said fuel gas, this does not limit the concentration of the fuel gas source utilized in preparing the continuous gas stream. For example, the continuous gas stream may be formed by combining an incoming fuel gas stream having a concentration within the combustible range for the corresponding fuel gas and an incoming carrier gas stream (such as air) having a flow rate sufficient to dilute the fuel gas below its combustible range. As such, the formed continuous gas steam of the above embodiment will have a concentration of fuel gas below the combustible range for said fuel gas, despite the utilization of a higher concentration fuel gas source.

With regards to the continuous gas stream entering the gradual oxidation apparatus 100, it should be understood that, regardless of the type of fuel gas used, the sources of the fuel gas and carrier gas, the method through which the fuel gas and carrier gas are combined, etc., that upon entering the gradual oxidation apparatus, the carrier gas comprises sufficient oxygen to achieve the substantial oxidation of the fuel gas within the continuous gas stream. In other words, the carrier gas is configured to have a suitable concentration of oxygen such that oxidation of the fuel gas may proceed to at least the substantial oxidation threshold (e.g., 99% of the fuel gas is oxidized) prior to the continuous gas stream leaving the gradual oxidation apparatus. As is understood, the amount of oxygen required for this substantial oxidation of the fuel gas depends upon the fuel gas being oxidized and the corresponding oxidation reaction that occurs. In an embodiment, the carrier gas used to form the continuous gas stream comprises oxygen, wherein the concentration of oxygen in the formed continuous gas stream is sufficient to facilitate the substantial oxidation of the fuel gas as described herein.

Figure 2:
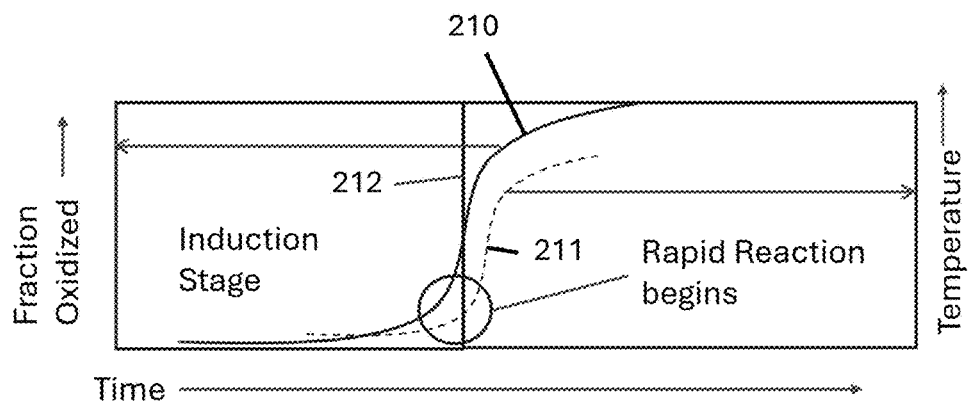
FIG. 2 illustrates the graph comparing the oxidation rate, temperature and time for an oxidation reaction in the gradual flow reactor, according to an aspect.

FIG. 2 illustrates the graph comparing the oxidation rate, temperature and time for a reaction in a gradual flow reactor, according to an aspect. The first curve 210 represents the fraction oxidized with time under certain conditions, such as an initial temperature and pressure. The second curve 211 represents a different set of conditions, such as lower pressure or lower initial temperature. The first line 212 represents the transition point from the induction stage to the rapid reaction stage, as explained in greater detail below. As seen in FIG. 2, the rate of reaction for the oxidation of methane may be broadly divided into two stages. The first stage, referred to as the "Induction Stage", may be gradual, during which the rate of oxidation is low. Again, during this Induction Stage, some intermediate oxidation products, such as methanol, carbon monoxide and formaldehyde are created, and some heat is released (e.g., the formation of these intermediate oxidation products from methane and oxygen is an exothermic reaction). As such, as the reaction proceeds, the temperature of the mixture increases, and as the temperature increases, so too does the rate of reaction.

From there, the reaction may then move to a "Stable Stage" ("Rapid Oxidation Stage") during which the formed intermediate products may be rapidly oxidized into the final reaction products (e.g., water and carbon dioxide). As is understood, in an embodiment, if methane is provided with sufficient time and oxygen within the reactor body under sufficient heating conditions, the methane will be substantially oxidized. Furthermore, as seen in FIG. 2, the increasing temperature also plays a role in accelerating the oxidation of methane.

As is understood, a gas stream traveling through the cold gas channel of the heat exchanger, such as cold gas channel 101a of heat exchanger 101 of FIG. 1, may enter the reactor body 104 at a temperature where the mixture is nearing its induction phase. From there, the gas stream enters the reactor body, such as reactor body 104 of FIG. 1, wherein it is provided with sufficient time to transition from the induction phase to the rapid reaction phase as it travels within the reactor body and oxidizes. As the corresponding fuel gas (such as methane) within the gas stream is rapidly oxidized after entering the rapid reaction phase, the temperature of the gas stream increases. As the gas stream exits the reactor body after having its fuel gas oxidized, this hotter oxidized gas stream traveling through the hot gas channel of the heat exchanger heats up the cooler unoxidized gas stream traveling through the cold gas channel, until the fuel gas within the cooler unoxidized gas stream nears the end of its induction phase. This creates a continuous heating process, wherein the extra heat generated from the oxidized gas stream is utilized to preheat the unoxidized gas steam prior to its entry to the reactor body. This process of heating the fuel gas of the gas stream to nearly its induction phase using the heat exchanger and subsequently reaching the rapid reaction phase within the reactor body for the oxidation of methane (or other fuel gas) may overall be referred to as a "gradual oxidation", comprising an induction stage and a rapid oxidation stage.

It should be understood that the term "unoxidized gas stream" refers to a gas stream having an unoxidized fuel gas (such as methane), whereas the term "oxidized gas stream" refers to a gas stream having substantially oxidized fuel gas products. As such, calling a gas stream oxidized or unoxidized is intended to indicate the status of the fuel gas within said gas stream, as well as providing an approximate indication of its current position within the gradual oxidation apparatus.

Figure 3A:
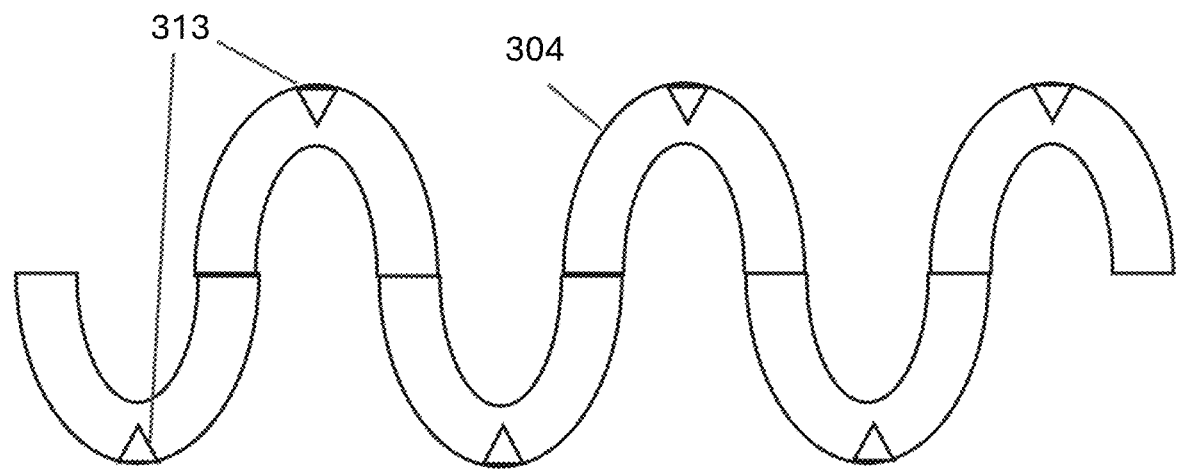
FIG. 3A illustrates a schematic of an alternative embodiment of a serpentine reactor body for a gradual oxidation apparatus, according to an aspect.

FIG. 3A illustrates a schematic of an alternative embodiment of a serpentine reactor body 304 for a gradual oxidation apparatus, according to an aspect. As disclosed hereinabove, the general configuration of a serpentine shaped reactor body may be well suited for use in methane oxidation, as the disclosed serpentine reactor body 304 may be configured to provide sufficient time and mixing to achieve substantial oxidation of the methane within the gas stream prior to leaving the reactor body 304. The disclosed serpentine reactor body 304 of FIG. 3A may include additional features that further improve mixing of gases within the reactor, when compared to the serpentine reactor body 104 of FIG. 1.

In an embodiment, a gradual oxidation apparatus may further comprise a plurality of diverters 313 nested within the reactor body 304. These diverters 313 may be configured to further mix the gas stream travelling through the reactor body 304, to further ensure a homogenized gas mixture, and thus more efficient oxidation of the methane within the gas stream as it travels through the serpentine reactor body 304. The diverters 313 may also have other uses, such as being electrically or otherwise externally heated as a means to assist the oxidation reaction.

Figure 3B:
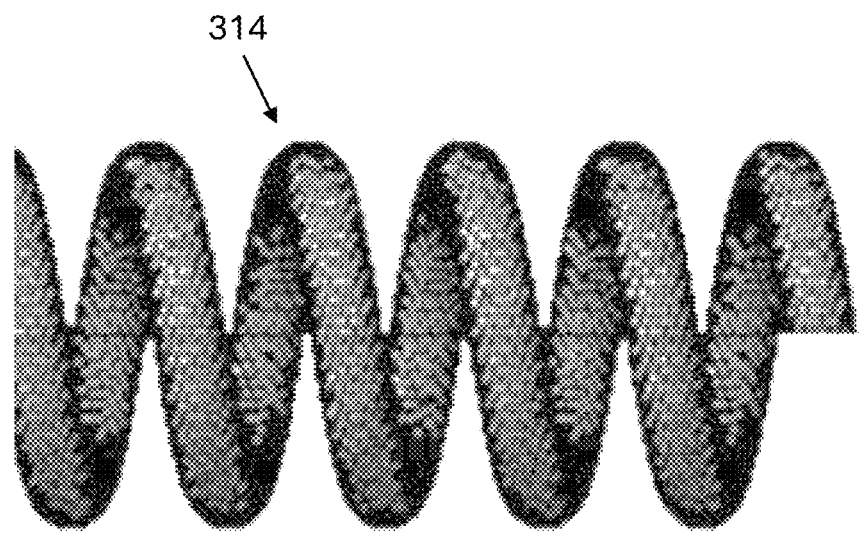
FIG. 3B illustrates a front view of coiled reactor body for a gradual oxidation apparatus, according to an aspect.

FIG. 3B illustrates a front view of coiled reactor body 314 for a gradual oxidation apparatus, according to an aspect. The disclosed coiled reactor body 314 may be conceptually similar to the serpentine reactor bodies 104, 304 of FIGS. 1 and 3A above, in that said coiled reactor body 314 of FIG. 3B is configured to efficiently maximize residence time of the gas stream within it, while minimizing its overall dimensions. Rather than using alternating curves as seen in FIG. 1, 3A, the coiled reactor body 314 may be spiraled continuously in a coiled shape. This coiled reactor body 314 of FIG. 3B may have a greater depth (as measured into and out of the page) than other reactor body embodiments disclosed herein but may also provide increased residence time per overall length (e.g., increased pathlength per overall structure length), when compared to a linear/straight reactor body structure.

Figure 3C:
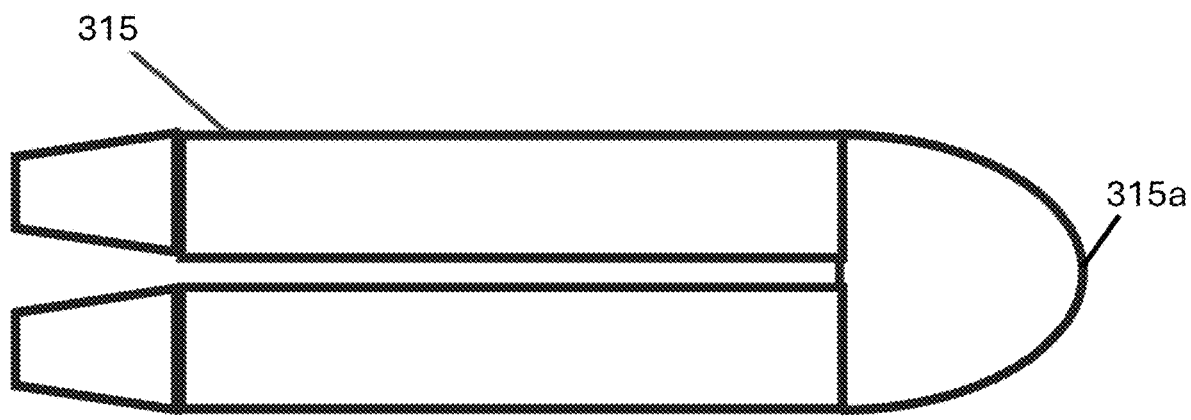
FIG. 3C illustrates a schematic of a U-tube reactor body for a gradual oxidation apparatus, according to an aspect.

FIG. 3C illustrates a schematic of a U-tube reactor body 315 for a gradual oxidation apparatus, according to an aspect. In contrast to the other disclosed reactor bodies of FIG. 1, 3A, 3B, 3D, etc., the disclosed U-tube reactor body 315 may be advantageous for its overall simplicity, low fabrication cost and robustness. As shown in FIG. 3C, the internal cross-sectional area of the U-tube reactor body 315 may be made larger at a corresponding middle portion 315a of said U-tube reactor body 315 (when compared to the internal cross-sectional area/flow area of the pipes leading to and from the U-tube reactor body 315 and the other portions of the U-tube reactor body), such that it slows gas velocity within the U-tube reactor body 315, thus providing additional residence time within the U-tube reactor body 315 for oxidation of the fuel gas.

Figure 3D:
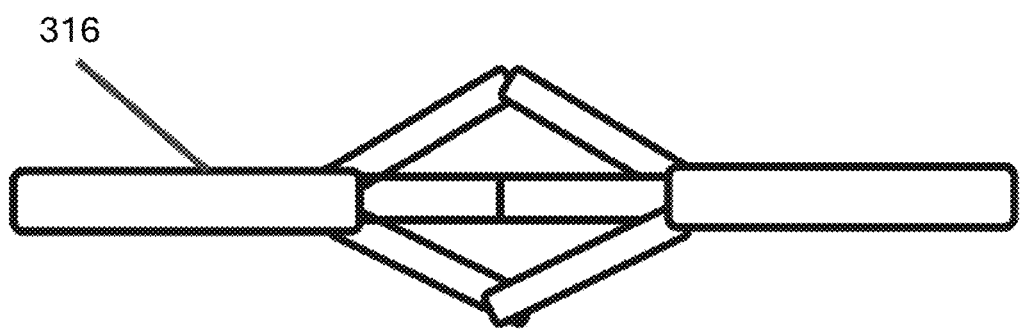
FIG. 3D illustrates a schematic of a forked reactor body for a gradual oxidation apparatus, according to an aspect.

FIG. 3D illustrates a schematic of a forked reactor body 316 for a gradual oxidation apparatus, according to an aspect. The disclosed forked reactor body 316 may be configured to divert the incoming gas stream into three (or more) separate branched gas streams, before recombining them back into a singular gas stream. This forked reactor body 316 may be configured to provide additional mixing to a gas stream travelling through it by further mixing the gas stream using its alternative structure. In an embodiment, the forked structure of the forked reactor body 316 may also help absorb the expansive forces exerted as the reactor temperature rises. While several potential embodiments of the reactor body may be disclosed herein, it should be understood that similar configurations may also be utilized, as long as said reactor bodies are suitably configured to provide suitable mixing and sufficient gas residence time at the necessary flow rates to provide/facilitate substantial oxidation of the methane within the gas stream prior to exiting the gradual oxidation apparatus.

Figure 4A:
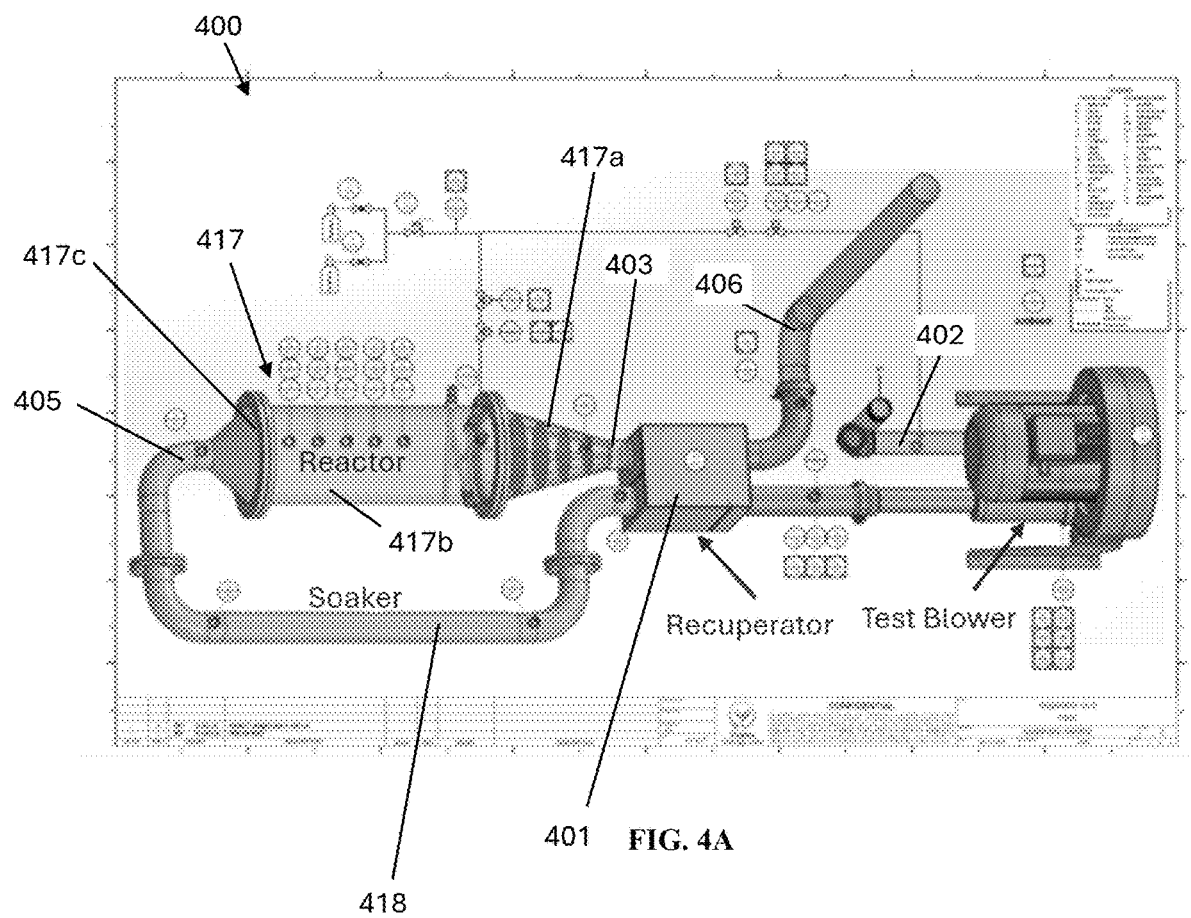
FIGS. 4A-4B illustrate top views of an embodiment of the gradual oxidation apparatus having a variable area reactor body, according to an aspect.
Figure 4B:
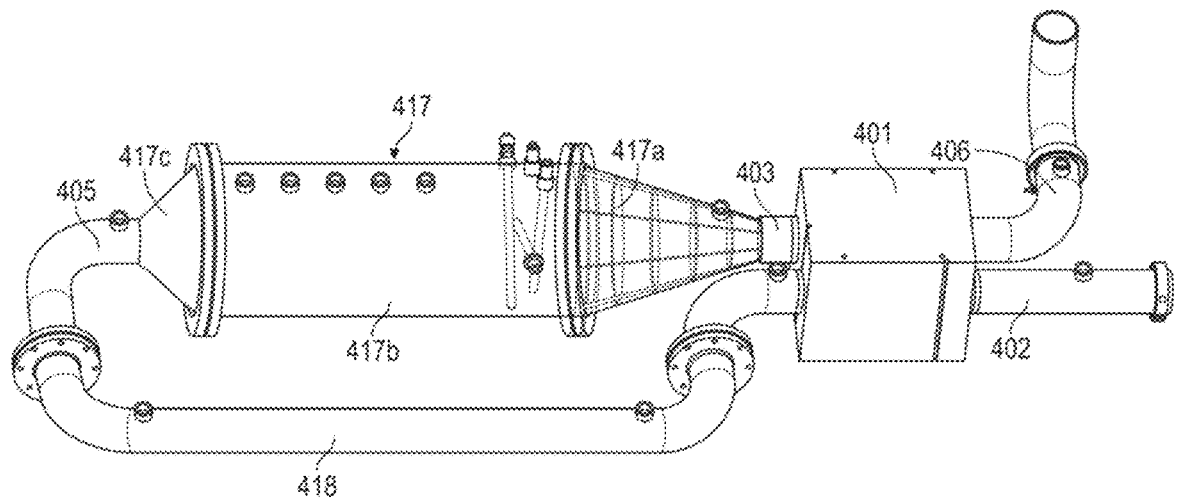
Figure 4C:
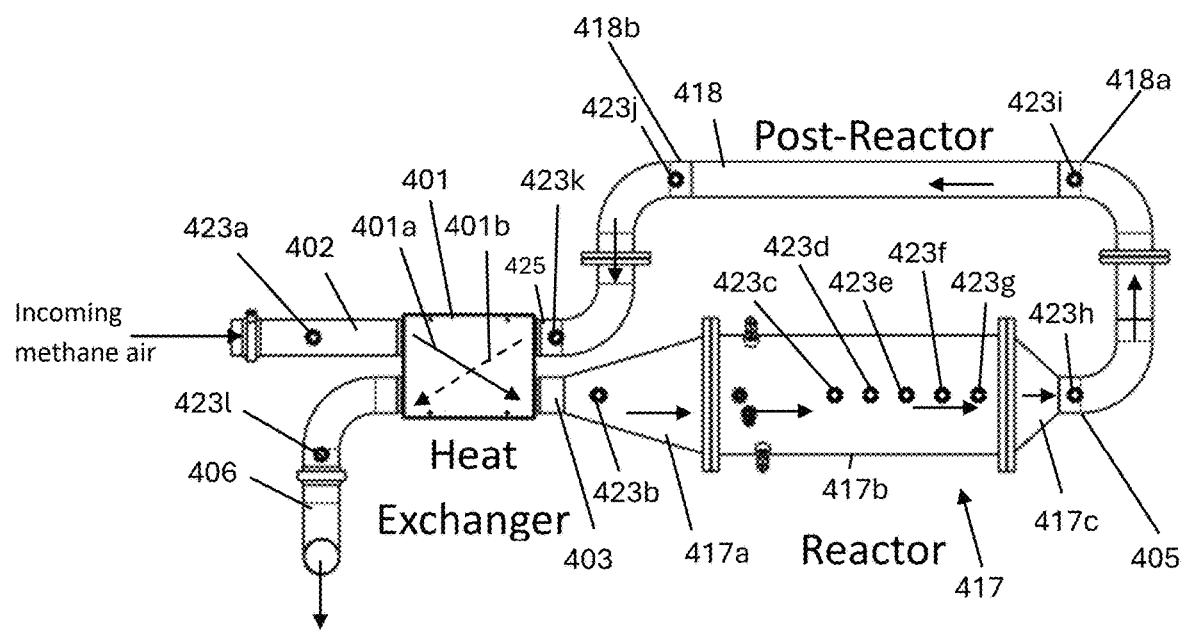
FIG. 4C illustrates a schematic of a gradual oxidation apparatus having a variable area reactor body, according to an aspect.

FIGS. 4A-4B illustrate top views of an embodiment of the gradual oxidation apparatus 400 having a variable area reactor body 417, according to an aspect. FIG. 4C illustrates a schematic of a gradual oxidation apparatus 400 having a variable area reactor body 417, according to an aspect. As shown in FIG. 4A-4C, a gradual oxidation apparatus 400 may utilize a reactor body 417 having a variable internal cross-sectional area in order to increase residence time of the gas stream within the reactor body 417.

The disclosed gradual oxidation apparatus 400 of FIGS. 4A-4C may have several similarities to the hereinabove disclosed gradual flow reactor of FIG. 1. As can be seen in FIG. 4A-4C, the gradual oxidation apparatus 400 may comprise an apparatus inlet port 402, a heat exchanger/recuperator 401 in fluid communication with the apparatus inlet port 402, a reactor body 417 in fluid communication with the heat exchanger/recuperator 401, a soaker channel ("post-reactor channel") 418 in fluid communication with the reactor body 417 and the heat exchanger/recuperator 401 and an apparatus outlet port 406 in fluid communication with the heat exchanger/recuperator 401. In an embodiment, as can be seen in FIG. 4C, the incoming gas stream containing methane may be fed into the apparatus inlet port 402, and travel through the corresponding cold gas channel 401a of heat exchanger 401 into the reactor body 417, wherein the methane is configured to be substantially oxidized. From the reactor body 417 the gas stream may travel through a soaker channel 418 before traveling through the corresponding hot gas channel 401b of the heat exchanger 401 and exiting the gradual oxidation apparatus 400 through the apparatus outlet port 406. In an alternative embodiment, the gradual oxidation apparatus 400 may be configured to substantially oxidize the fuel gas within the gas stream prior to the gas stream exiting the soaker channel 418, wherein substantial oxidation is achieved within the soaker channel 418. In yet another alternative embodiment, the gradual oxidation apparatus may be configured to substantially oxidize the fuel gas within the gas stream prior to the gas stream exiting the apparatus outlet port 406, wherein substantial oxidation is achieved within the heat exchanger 401. As is understood, the cold gas channel 401a and hot gas channel 401b of the heat exchanger 401 may be in thermal communication with each other, such that the heat generated within the reactor body 417 from the oxidation of methane may be utilized to heat the gas stream entering the reactor body 417 to the threshold of oxidation for the methane (e.g. nearing the induction phase for the methane). For simplicity the cold gas channel 401a (and flow of unoxidized gas) may be represented by the solid arrow shown in FIG. 4C, whereas the hot gas channel 401b (and flow of oxidized exhaust gas) may be represented by the dotted arrow shown in FIG. 4C.

In an embodiment, a variable area reactor body 417 may comprise a first expanding flow area portion ("first conical portion") 417a in fluid communication with a reactor inlet port 403, a large cross-sectional area reactor channel ("a reactor channel with a large flow area", "reactor channel") 417b in fluid communication with the first expanding flow area portion 417a, and a second decreasing flow area portion ("second conical portion") 417c in fluid communication with the large cross-sectional area reactor channel 417b and a reactor outlet port 405. As can be seen in FIG. 4A-4B, in an embodiment, the first expanding flow area portion 417a and a second decreasing flow area portion 417c may both be conical in shape. As seen in FIG. 4C, the reactor outlet port 405 may also be in fluid communication with the soaker channel 418. As can be seen in FIGS. 4A-4C, in an embodiment, the internal cross-sectional area/flow area of the first expanding flow area portion 417a may be smaller at the side that engages with the reactor inlet port 403 and larger at the side that engages with the reactor channel 417b. In said embodiment, the internal cross-sectional area/flow area of the second decreasing flow area portion 417c may be smaller at the side that engages with the reactor outlet port 405 and larger at the side that engages with the reactor channel 417b.

As such, the internal cross-sectional area of the reactor body 417 of FIG. 4A-4C may start small at the reactor inlet port 403 (e.g., a first, small internal cross-sectional area), increase through the first expanding flow area portion 417a, remain consistent for over the length of the reactor channel 417b (e.g. a second, larger, internal cross-sectional area), decrease through the second decreasing flow area portion 417c, and return to the same internal cross-sectional area as the reactor inlet port 403 at the reactor outlet port 405.

As is understood, the flow area of the large cross-sectional area reactor channel 417b may be greater than that of the pipes leading to and from the variable area reactor body 417. This reactor channel with a large flow area may help to slow the gas velocity of the gas stream within the variable area reactor body 417, allowing the gas stream to reside within the high temperature environment of the variable area reactor body 417 for a long duration.

As can be seen in FIG. 4A-4C, the first expanding flow area portion 417a may be longer than the second decreasing flow area portion 417c, such that the transition between the smaller internal cross-sectional area of the reactor inlet port 403 and larger internal cross-sectional area of the reactor channel 417b occurs more gradually than the transition between the larger internal cross-sectional area of the reactor channel 417b and the smaller internal cross-sectional area of the reactor outlet port 405. As is understood, there are several factors that govern the shape and size of different portions of the reactor body 417. When gas velocities decline, the flow pattern may move from turbulent flow to mixed flow to laminar flow. Turbulent flow promotes mixing, whereas laminar flow is stratified and hinders mixing. Optimized oxidation of the incoming gas stream requires said gas stream to have suitable residence time within the reactor body 417, while also requiring thorough mixing. Varying the reactor body internal cross-sectional area, adding diverters, and other means, may be used to achieve both of the seemingly conflicting requirements described above. As shown in FIG. 2, the rate of reaction decreases after the rapid reaction stage. One purpose of the soaker channel 418 may be to provide additional time and turbulence within the gradual oxidation apparatus to achieve the remaining oxidation necessary to reach substantial oxidation (e.g., oxidation of 99% of the methane (or other oxidizable waste gas) in the gas stream). One of the most common applications of the disclosed gradual oxidation apparatus is to oxidize methane and other harmful gases. The soaker channel 418 provides the gas stream with additional residence time and further turbulence while at the maximum temperature, thus facilitating substantial oxidation as needed.

It should be understood that depending on the material and design utilized for the corresponding reactor body, such as reactor body 104 of FIG. 1, coiled reactor body 314 of FIG. 3B, reactor body 417 of FIG. 4C, etc., the physical properties and characteristics of the reactor body may vary. For example, if an application requires that reactor body be configured to expand and/or be flexible, a suitably flexible, expandable material may be used, such as stainless steel, which exhibits thermal expansion upon experiencing elevated temperatures and exhibits suitable levels of flexibility for reactor applications. As is understood, each of the disclosed reactor body embodiments may be made from stainless steel, as desired. Additionally, nickel alloys with greater strength at higher temperatures than stainless steels may be used for selected portions of the heat exchanger 401 and reactor body 417, as well as other components of the gradual oxidation apparatus 400, as needed to ensure suitable apparatus operation and longevity.

Alternatively, a material such as ceramic may be selected for the construction of the reactor body, depending on the needs of the corresponding gradual oxidation apparatus. In said embodiment, the walls of the reactor body may be coated in ceramic, to take advantage of the thermal properties of ceramics. Due to the inherent inflexibility of ceramics, certain reactor body embodiments may be better or worse suited for a ceramic construction. For example, the reactor body 417 of FIGS. 4A-4C may be well suited to be made from or include ceramic, as the increase in internal cross-sectional area present within the reactor body 417 may help avoid potential damage from rapid pressure/temperature increases that may occur during oxidation of the methane within the reactor body 417. In general, stainless steels have limited high-temperature strength compared to nickel and other alloys, but are less expensive. As such, stainless steel may be used for the colder segments of the heat exchanger, or other portions of the gradual oxidation apparatus not configured to contact higher temperature gas streams. Nickel alloys, ceramic liners, or composite materials may be considered for use in the reactor body 417, as well as other portions of the gradual oxidation apparatus. As can be seen in FIG. 4C, a plurality of temperature probe ports ("probe ports") 423a-423l may be nested within various portions of the gradual oxidation apparatus 400 in order to provide suitable docking locations for temperature probes to monitor temperatures at specific points within the gradual oxidation apparatus 400. In an embodiment, a first temperature probe port 423a may be nested within the apparatus inlet port 402, a second temperature probe port 423b may be nested within the first expanding flow area portion 417a of the reactor body 417, third, fourth, fifth, sixth and seventh temperature probe ports 423c, 423d, 423e, 423f, 423g may be nested within the reactor channel 417b of the reactor body 417, wherein the third temperature probe port is closest to the first expanding flow area portion 417a, with each sequential temperature probe of the fourth, fifth, sixth and seventh temperature probe ports 423d, 423e, 423f, 423g being progressively closer to the second decreasing flow area portion 417c of the reactor body 417, as seen in FIG. 4C. Furthermore, in said embodiment, an eight temperature probe port 423h may be nested in the reactor outlet port 405, ninth and tenth temperature probe ports 423i, 423j may be nested in the post-reactor channel 418, wherein the ninth temperature probe port 423i is nested in a first end 418a of the post-reactor channel 418 where the gas stream enters the post-reactor channel 418 and the tenth temperature probe port 423j is nested within a second end 418b of the post-reactor channel 418 where the gas stream leaves the post-reactor channel 418. Additionally, in said embodiment, an eleventh temperature probe port 423k may be nested within a post-reactor connector 425, wherein the post-reactor connector 425 is disposed between and in fluid communication with the hot gas channel 401b of the heat exchanger 101 and the post-reactor channel 418, and a twelfth temperature probe port 423l may be nested within the apparatus outlet port 406.

It should be noted that the hereinabove described placement of the plurality of temperature probe ports 423a-423l may be the same for various gradual oxidation apparatus embodiments disclosed herein, such as FIG. 4A-4B, as well as FIGS. 6A, 7A, 8A and 9A. As will be articulated in greater detail hereinbelow, the temperature of the continuous gas stream within a gradual oxidation apparatus may follow a certain trend, as observed by temperature probes nested within the corresponding temperature probe ports 423a-423l.

Figure 5:
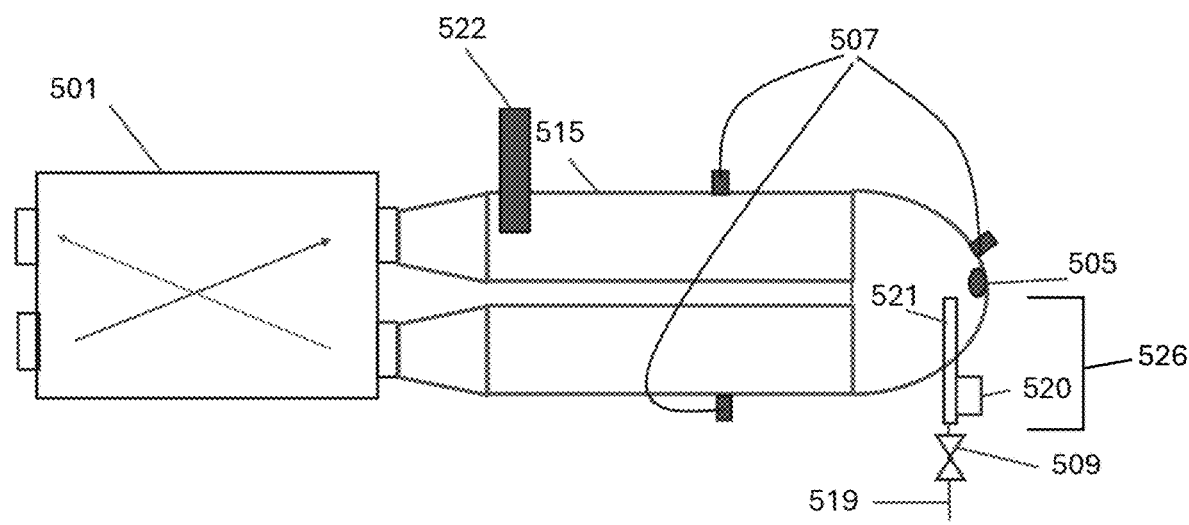
FIG. 5 illustrates a schematic of a reactor body having several heating options, according to an aspect.

FIG. 5 illustrates a schematic of a reactor body 515 having several heating options, according to an aspect. As is understood, while the ongoing exothermic oxidation reaction within the gradual oxidation apparatus 500 is configured to maintain continued oxidation during steady state operation, the disclosed gradual oxidation apparatus 500 may utilize a corresponding preheating device in order to supply the necessary heat energy to begin oxidation when the apparatus is starting up from a cold state. One option for providing preheating to the gradual oxidation apparatus 500 is to use gas, such as fuel gas, for heat up. For this gas preheating options, the gradual oxidation apparatus may further comprise a gas supply line 519 in fluid communication with a fuel gas supply, a gas control valve 509 in fluid communication with the gas supply line, a spark ignitor 520 or another suitable ignitor in fluid communication with the gas control valve 509 and the gas supply line 519 and a burner 521 nested within the reactor body 515, wherein the burner 521 is in fluid communication with the spark igniter 520. The combination of the burner 521 and the spark ignitor 520 may be referred to as a gas-powered heater 526, wherein gas powered heater 526 is associated with the reactor body 515 and configured to ignite a heater fuel gas from a gas supply line 519 to facilitate heating of the reactor body 515 and its contents. As is understood, the flow of a fuel gas from the gas supply line 519 into the reactor body 515 may be controlled through selective actuation of the gas control valve 509, and the subsequent ignition of the fuel gas for heating of the reactor body 515 may be controlled through selective actuation of the ignitor 520. The reactor body 515 may be heated while the gas is flowing or not, depending on the control desired.

In an alternative embodiment, the gradual oxidation apparatus 500 may further comprise an electric heater 522 inserted within or otherwise associated with the reactor body 515. An electrical heater 522 may be preferred over a fuel supply line based heater for embodiments lacking access to a corresponding fuel gas supply. Furthermore, both of the electrical and gas supply line based preheater options may be used alone or together, alongside other preheating options not explicitly disclosed herein. As mentioned hereinabove, the gradual oxidation apparatus may also comprise a temperature measuring device 505 configured to measure the temperature near the corresponding heating device to make sure the heater is working and also to keep from overheating the reactor body 515. The disclosed temperature measuring device 505 may be utilized in conjunction with other temperature monitoring devices 507, such as temperature monitoring devices 107a-107e of FIG. 1. While the reactor body utilized in FIG. 5 may be similar to the U-tube reactor body 315 of FIG. 3C, it should be noted that the disclosed heating methods may be utilized with other types of reactor bodies disclosed herein, as well as other potential reactor body configurations. Once sufficient preheating is provided to the gradual oxidation apparatus 500 during start up, further preheating of the incoming gas stream may be provided by the heat exchanger 501, as described hereinabove.

Figures 6A, 6B:
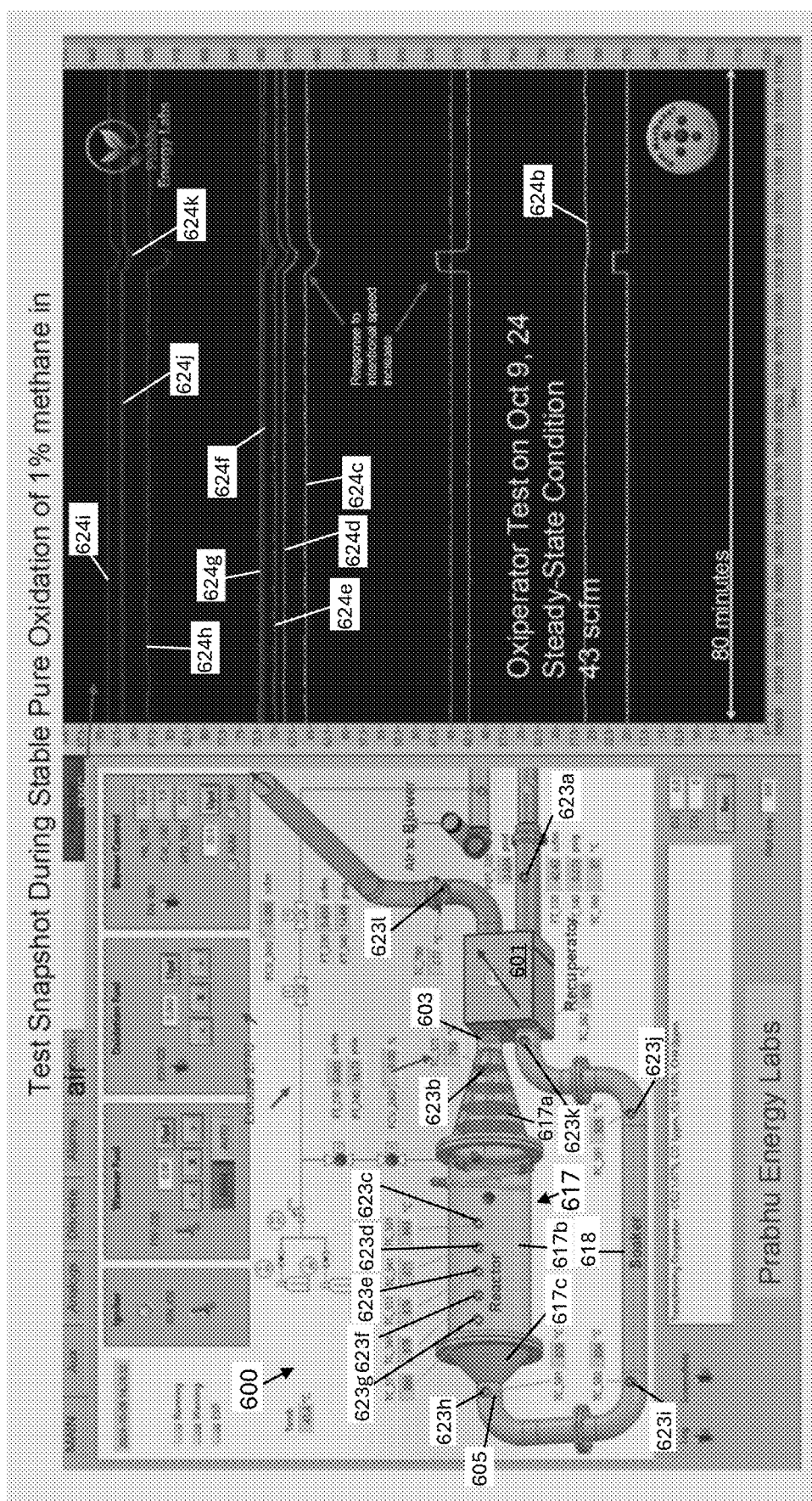
FIG. 6A illustrates an embodiment of the gradual oxidation apparatus performing a stable oxidation of a 1% methane incoming gas stream at steady state, according to an aspect.
FIG. 6B illustrates a graph showing the temperature of the gas stream at several locations within the gradual oxidation apparatus of FIG. 6A over time, according to an aspect.

FIG. 6A illustrates an embodiment of the gradual oxidation apparatus 600 performing a stable oxidation of a 1% methane incoming gas stream at steady state, according to an aspect. FIG. 6B illustrates a graph showing the temperature of the continuous gas stream at several locations within the gradual oxidation apparatus of FIG. 6A over time, according to an aspect. As can be seen in FIG. 6A, the gradual oxidation apparatus 600 of FIG. 6A may be structurally the same or similar to the gradual oxidation apparatus 400 of FIG. 4A-4C. As such, in an embodiment, the oxidation apparatus 600 of FIG. 6A may have all the same elements arranged in the same manner as the gradual oxidation apparatus 400 of FIG. 4A. In an embodiment, the gradual oxidation apparatus 600 may comprise a first expanding flow area portion 617a in fluid communication with the reactor inlet port 603, a large cross-sectional area reactor channel 617b in fluid communication with the first expanding flow area portion 617a, and a second decreasing flow area portion 617c in fluid communication with the large cross-sectional area reactor channel 617b and a reactor outlet port 605. As is understood, the gradual oxidation apparatus 600 may comprise a plurality of temperature probe ports 623a-623l, each of which is configured to receive a corresponding temperature probe. In an embodiment, each temperature probe port 623a-623l may be disposed at a corresponding location on the gradual oxidation apparatus 600, such as the locations of the temperature probe ports 423a-423l of FIG. 4C articulated hereinabove.

In order to suitably monitor the performance of the gradual oxidation apparatus 600 of FIG. 6A, a graph showing temperature lines 624b-624k over time for temperature probes disposed within corresponding temperature probe ports is shown in FIG. 6B. It should be noted that the measurements taken by the temperature probes at the first temperature probe port 623a and the twelfth temperature probe port 623l are too low to be seen in FIG. 6B, but are about 37 degrees Celsius and about 277 degrees Celsius, respectively. For simplicity, it should be understood that each temperature probe slot 623a-623l is configured to hold a corresponding temperature probe, with the first temperature probe slot 623a being configured to hold a first temperature probe, the second temperature probe slot 623b being configured to hold a second temperature probe, and so on. Furthermore, recitation of a temperature at a corresponding temperature probe port should be understood to describe the temperature of the continuous gas stream at that corresponding probe port. As can be seen in FIG. 6B, the gradual oxidation apparatus 600 is operating at steady state, as indicated by the roughly constant temperatures for each temperature line 624b-624k over time.

In the embodiment of FIG. 6A-6B, it can be seen that the temperature at the first temperature probe port 623a is about 37 degrees Celsius, prior to entering the heat exchanger 601. The temperature at the second probe port 623b (as shown by second temperature line 624b) after exiting the heat exchanger 601 is about 765 degrees Celsius. The temperature at the third temperature probe port 623c (as shown by third temperature line 624c) after entering the reactor channel 617b is about 863 degrees Celsius. The temperatures at the fourth, fifth, sixth and seventh temperature probe ports 623d, 623e, 623f, 623g (as shown by third temperature lines 624d, 624e, 624f, 624g, respectively) are about 871 degrees Celsius, about 874 degrees Celsius, about 878 degrees Celsius, and about 880 degrees Celsius, respectively. The temperature at the eighth temperature probe port 623h (as shown by the eighth temperature line 624h) is about 920 degrees Celsius. The temperature at the ninth temperature probe port 623i (as shown by temperature line 624i) is about 934 degrees Celsius. The temperature at the tenth temperature probe port 623j (as shown by tenth temperature line 624j) is about 929 degrees Celsius. The temperature at the eleventh temperature probe port 623k (as shown by temperature line 624k) is about 929 degrees Celsius. Finally, as mentioned above, the temperature at the twelfth temperature probe slot 623l is about 277 degrees Celsius.

As is understood, the exothermic oxidation of methane within the reactor body 617 and soaker channel 618 significantly increases the temperature of the continuous gas stream, such that the heated continuous gas stream traveling through the hot gas channel of the heat exchanger 601 is configured to preheat the continuous gas stream traveling through the cold gas channel of the heat exchanger 601 prior to entering the reactor body 617. As mentioned hereinabove, this preheating of the continuous gas stream traveling through the cold gas channel of the heat exchanger 601 is configured to heat the corresponding continuous gas stream such that it nears the end of its induction phase prior to entering the reactor body 617, wherein the reactor body 617 is configured to facilitate the transitioning between the induction phase and the rapid oxidation phase. As can be seen in FIG. 6A, the composition of the gas stream leaving the gradual oxidation apparatus 600 is 1.07% $CO_2$, 19.0% $O_2$, with 1 ppm CO and 0 ppm $CH_4$.

Figures 7A, 7B:
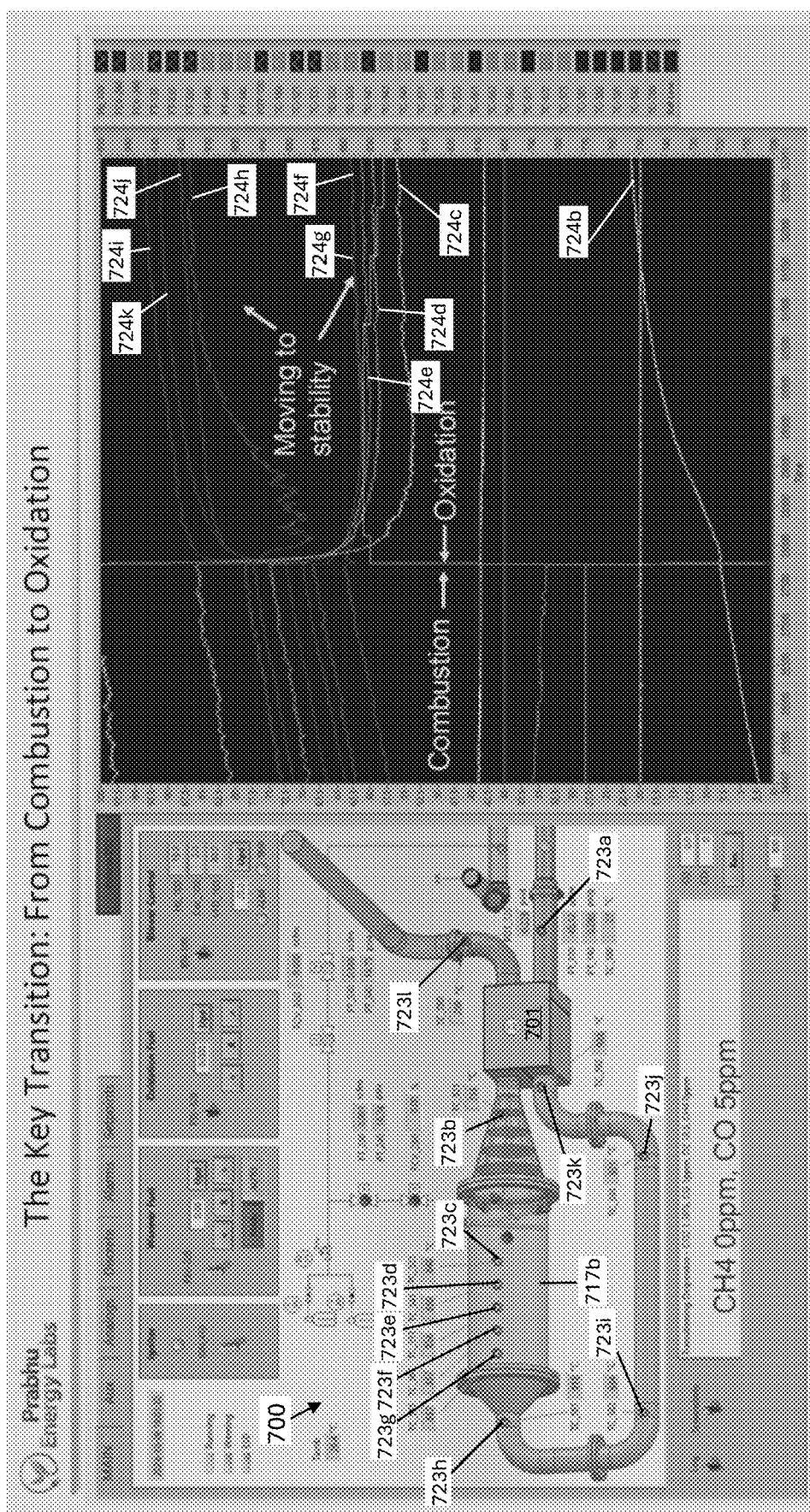
FIG. 7A illustrates an embodiment of the gradual oxidation apparatus transitioning from a combustion reaction to an oxidation reaction, according to an aspect.
FIG. 7B illustrates a graph showing the temperature of the gas stream at several locations within the gradual oxidation apparatus of FIG. 7A over time, according to an aspect.

FIG. 7A illustrates an embodiment of the gradual oxidation apparatus transitioning from a combustion reaction to an oxidation reaction, according to an aspect. FIG. 7B illustrates a graph showing the temperature of the continuous gas stream at several locations within the gradual oxidation apparatus of FIG. 7A over time, according to an aspect. Similarly to the gradual oxidation apparatus 600 of FIG. 6A, the gradual oxidation apparatus 700 of FIG. 7A may have the same structure as gradual oxidation apparatus 400 of FIG. 4C. In contrast to the operating conditions discussed in FIG. 6A-6B, the operating conditions of the gradual oxidation apparatus 700 of FIG. 7A and the corresponding graph of FIG. 7B may display the operation of the gradual oxidation apparatus 700 when transitioning from a combustion reaction to an oxidation reaction. As can be seen in FIG. 7B, while the temperatures at points of the gradual oxidation apparatus 700 may vary while transitioning from combustion to oxidation, said temperature may stabilize as time proceeds and equilibrium is achieved.

In the embodiment of FIG. 7A-7B, it can be seen that the temperature at the first temperature probe port 723a is about 27 degrees Celsius, prior to entering the heat exchanger 701. The temperature at the second probe port 723b (as shown by second temperature line 724b) after exiting the heat exchanger 701 is about 753 degrees Celsius. The temperature at the third temperature probe port 723c (as shown by third temperature line 724c) after entering the reactor channel 717b is about 840 degrees Celsius. The temperatures at the fourth, fifth, sixth and seventh temperature probe ports 723d, 723e, 723f, 723g (as shown by third temperature lines 724d, 724e, 724f, 724g, respectively) are about 850 degrees Celsius, about 854 degrees Celsius, about 857 degrees Celsius, and about 857 degrees Celsius, respectively. The temperature at the eighth temperature probe port 723h (as shown by the eighth temperature line 724h) is about 918 degrees Celsius. The temperature at the ninth temperature probe port 723i (as shown by temperature line 724i) is about 934 degrees Celsius. The temperature at the tenth temperature probe port 723j (as shown by tenth temperature line 724j) is about 921 degrees Celsius. The temperature at the eleventh temperature probe port 723k (as shown by temperature line 724k) is about 928 degrees Celsius. Finally, the temperature at the twelfth temperature probe slot 723l is about 250 degrees Celsius. As can be seen in FIG. 7A, the composition of the gas stream leaving the gradual oxidation apparatus 700 is 1.36% $CO_2$, 18.5% $O_2$, with 5 ppm CO and 0 ppm $CH_4$.

Figures 8A, 8B:
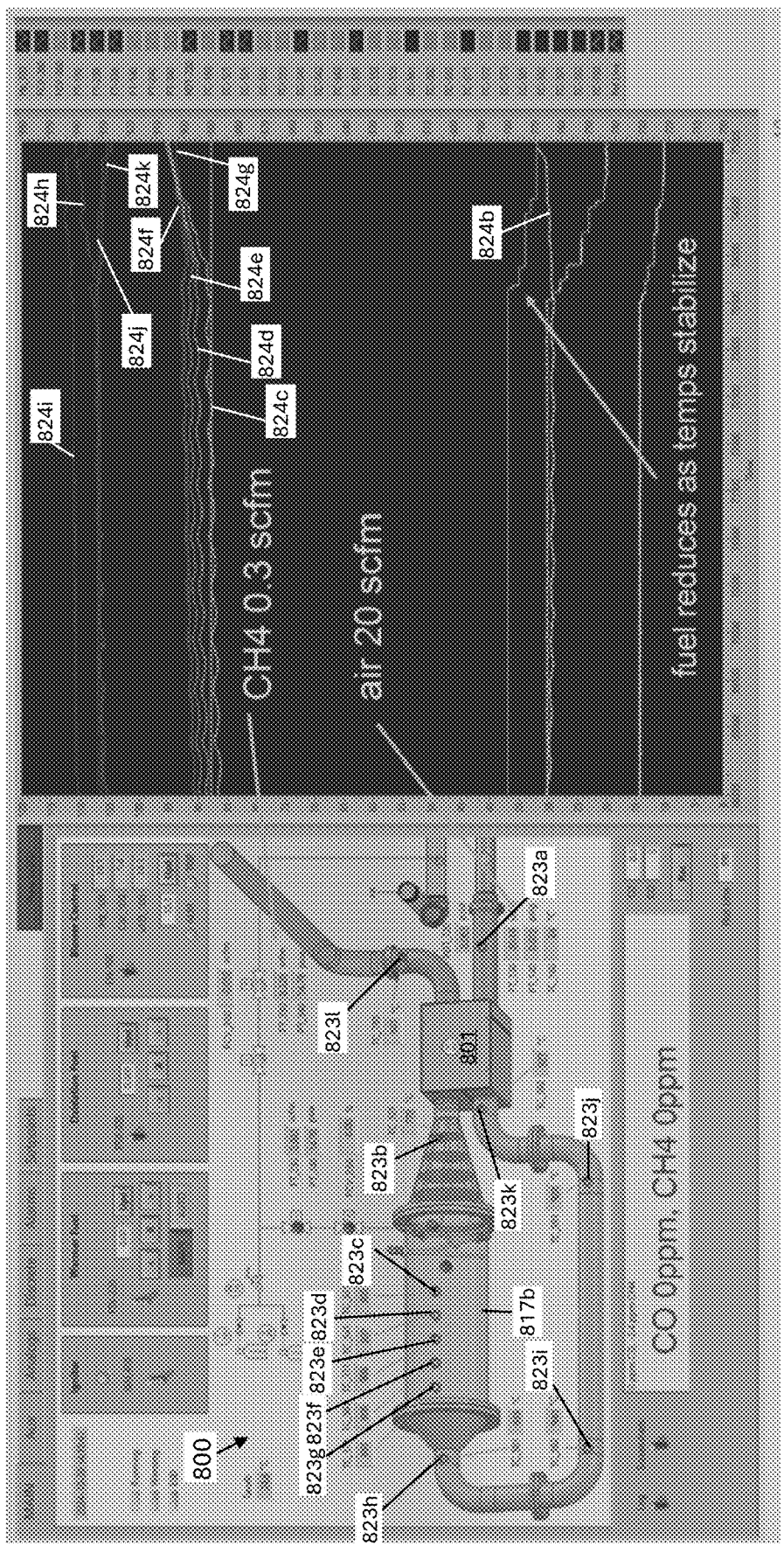
FIG. 8A illustrates an embodiment of the gradual oxidation apparatus performing an oxidation reaction under a first set of experimental conditions, according to an aspect.
FIG. 8B illustrates a graph showing the temperature of the gas stream at several locations within the gradual oxidation apparatus of FIG. 8A over time, according to an aspect.

FIG. 8A illustrates an embodiment of the gradual oxidation apparatus performing an oxidation reaction under a first set of experimental conditions, according to an aspect. FIG. 8B illustrates a graph showing the temperature of the continuous gas stream at several locations within the gradual oxidation apparatus of FIG. 8A over time, according to an aspect. As seen in FIG. 8A-8B, this first set of experimental conditions for the gradual oxidation apparatus 800 of FIG. 8A-8B includes receiving a continuous gas stream comprising 0.3 scfm methane (fuel gas) and 20 scfm air (carrier gas). Under these experimental conditions, upon achieving stability, it was found that the continuous gas stream leaving the gradual oxidation apparatus 800 contained less than 10 ppm CO and 0 ppm $CH_4$.

In the embodiment of FIG. 8A-8B, it can be seen that the temperature at the first temperature probe port 823a is about 24 degrees Celsius, prior to entering the heat exchanger 801. The temperature at the second probe port 823b (as shown by second temperature line 824b) after exiting the heat exchanger 801 is about 770 degrees Celsius. The temperature at the third temperature probe port 823c (as shown by third temperature line 824c) after entering the reactor channel 817b is about 905 degrees Celsius. The temperatures at the fourth, fifth, sixth and seventh temperature probe ports 823d, 823e, 823f, 823g (as shown by third temperature lines 824d, 824e, 824f, 824g, respectively) are about 907 degrees Celsius, about 906 degrees Celsius, about 906 degrees Celsius, and about 903 degrees Celsius, respectively. The temperature at the eighth temperature probe port 823h (as shown by the eighth temperature line 824h) is about 935 degrees Celsius. The temperature at the ninth temperature probe port 823i (as shown by temperature line 824i) is about 940 degrees Celsius. The temperature at the tenth temperature probe port 823j (as shown by tenth temperature line 824j) is about 928 degrees Celsius. The temperature at the eleventh temperature probe port 823k (as shown by temperature line 824k) is about 927 degrees Celsius. Finally, the temperature at the twelfth temperature probe slot 823l is about 303 degrees Celsius.

Figures 9A, 9B:
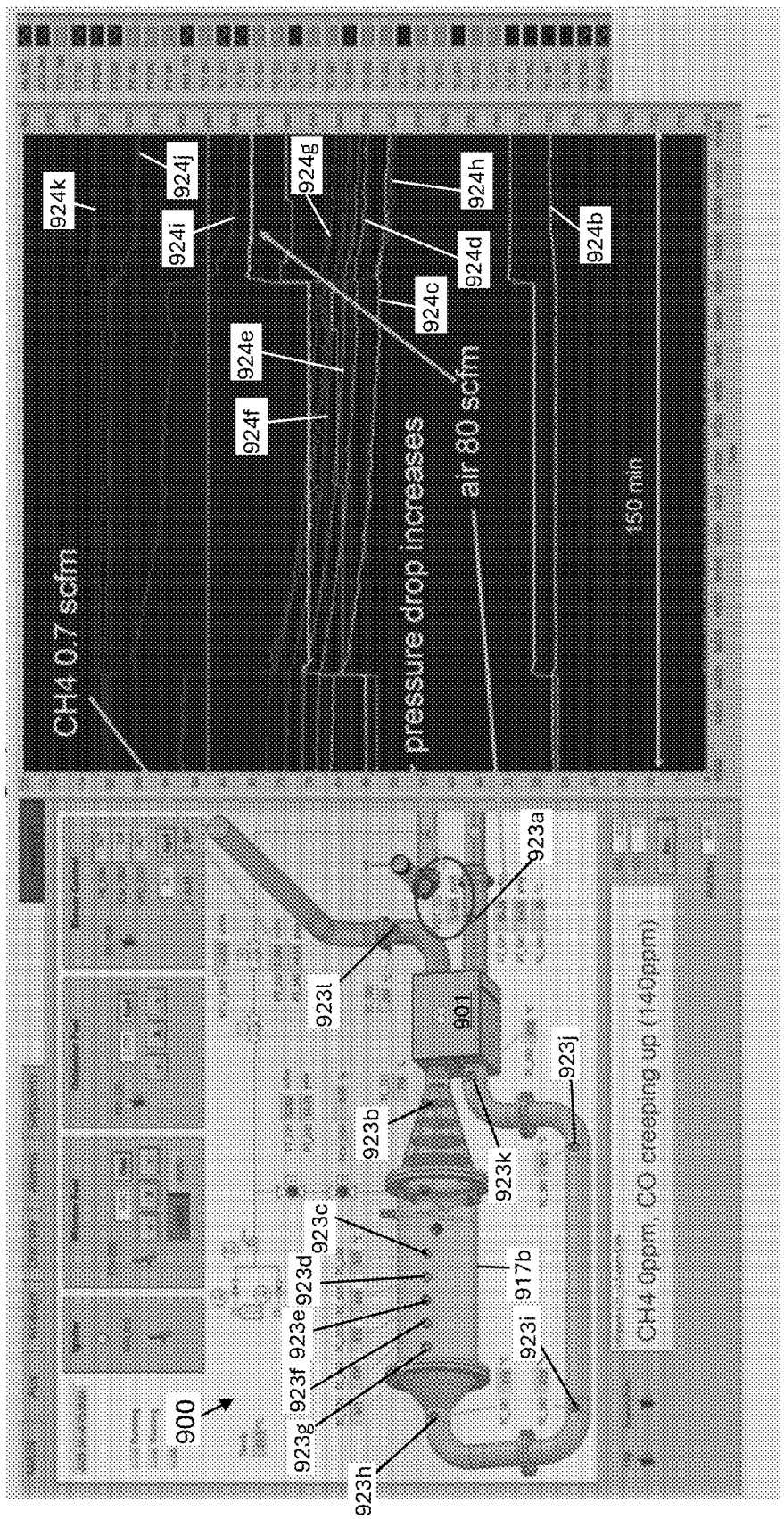
FIG. 9A illustrates an embodiment of the gradual oxidation apparatus performing an oxidation reaction under a second set of experimental conditions, according to an aspect.
FIG. 9B illustrates a graph showing the temperature of the gas stream at several locations within the gradual oxidation apparatus of FIG. 9A over time, according to an aspect.

FIG. 9A illustrates an embodiment of the gradual oxidation apparatus performing an oxidation reaction under a second set of experimental conditions, according to an aspect. FIG. 9B illustrates a graph showing the temperature of the continuous gas stream at several locations within the gradual oxidation apparatus of FIG. 9A over time, according to an aspect. As seen in FIG. 9A-9B, this second set of experimental conditions for the gradual oxidation apparatus 900 of FIG. 9A-9B includes receiving a continuous gas stream comprising 0.7 scfm methane (fuel gas) and 80 scfm air (carrier gas). Under these experimental conditions, it was found that the continuous gas stream leaving the gradual oxidation apparatus 900 contained 140 ppm CO and 0 ppm $CH_4$, with the CO emissions creeping up over time.

In the embodiment of FIG. 9A-9B, it can be seen that the temperature at the first temperature probe port 923a is about 29 degrees Celsius, prior to entering the heat exchanger 901. The temperature at the second probe port 923b (as shown by second temperature line 924b) after exiting the heat exchanger 801 is about 759 degrees Celsius. The temperature at the third temperature probe port 923c (as shown by third temperature line 924c) after entering the reactor channel 917b is about 821 degrees Celsius. The temperatures at the fourth, fifth, sixth and seventh temperature probe ports 923d, 923e, 923f, 923g (as shown by third temperature lines 924d, 924e, 924f, 924g, respectively) are about 829 degrees Celsius, about 832 degrees Celsius, about 836 degrees Celsius, and about 841 degrees Celsius, respectively. The temperature at the eighth temperature probe port 923h (as shown by the eighth temperature line 924h) is about 819 degrees Celsius. The temperature at the ninth temperature probe port 923i (as shown by temperature line 924i) is about 878 degrees Celsius. The temperature at the tenth temperature probe port 923j (as shown by tenth temperature line 924j) is about 915 degrees Celsius. The temperature at the eleventh temperature probe port 923k (as shown by temperature line 924k) is about 933 degrees Celsius. Finally, the temperature at the twelfth temperature probe slot 923l is about 284 degrees Celsius.

As can be seen in FIG. 6A-9B, varying the flow rate and composition of the continuous gas stream entering the corresponding gradual oxidation apparatus influences the peak temperatures achieved within the gradual oxidation apparatus (and where said peak is reached), as well as the composition of the continuous gas stream leaving the corresponding gradual oxidation apparatus. Furthermore, temperatures within the gradual oxidation apparatus may reach a steady state following the transition from combustion to oxidation after a certain amount of time, as seen in FIG. 7A-7B. It should be understood that for each graph of FIGS. 6B, 7B, 8B and 9B, the x-axis measures time in seconds, whereas the right side y-axis measures temperature in degrees Celsius and the left side y-axis is used to depict other variables, such as the frequency of the variable speed drive of a blower of the gradual oxidation apparatus or the fuel or air flow rate. In some instances, the parameter measured on the left side y-axis may be multiplied or divided by multiples of 10 in order to fit within the range of the graph.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. An oxidation apparatus configured to receive a gas stream having a fuel gas mixed with a carrier gas, the carrier gas comprising oxygen, wherein the concentration of the fuel gas in the gas stream is below a combustible range, the oxidation apparatus comprising:
   an apparatus inlet port configured to receive the gas stream;
   a heat exchanger in fluid communication with the apparatus inlet port, the heat exchanger comprising:
      a cold gas channel in fluid communication with the apparatus inlet port; and
      a hot gas channel in thermal communication with the cold gas channel;
   a reactor inlet port in fluid communication with the cold gas channel;
   a variable area reactor body in fluid communication with the reactor inlet port, the variable area reactor body comprising:
      a first expanding flow area portion in fluid communication with the reactor inlet port;
      a reactor channel with a large flow area in fluid communication with the first expanding flow area portion; and
      a second decreasing flow area portion in fluid communication with the reactor channel;

a reactor outlet port in fluid communication with the second decreasing flow area portion;

a soaker channel in fluid communication with the reactor outlet port and the hot gas channel; and an apparatus outlet port in fluid communication with the hot gas channel, wherein the apparatus outlet port is configured to emit the gas stream from the oxidation apparatus;

wherein the oxidation apparatus is configured to provide the gas stream with heating to achieve gradual oxidation of the fuel gas, whereby the gradual oxidation of the fuel gas raises the temperature of the gas stream, thus increasing the oxidation rate of the fuel gas and further increasing the temperature of the gas stream; such that heat is transferred from higher temperature gas travelling through the hot gas channel to lower temperature gas travelling through the cold gas channel, raising the temperature of the lower temperature gas travelling through the cold gas channel to initiate and maintain gradual oxidation of the fuel gas, to facilitate substantial oxidation of the fuel gas of the gas stream within the oxidation apparatus.

2. The oxidation apparatus of claim 1, wherein the variable area reactor body is made from a ceramic material.

3. The oxidation apparatus of claim 1, wherein the variable area reactor body is configured to be preheated prior to receiving the continuous gas stream.

4. An oxidation apparatus configured to receive a continuous gas stream having a fuel gas mixed with a carrier gas, the carrier gas comprising oxygen, wherein the concentration of the fuel gas in the continuous gas stream is below a combustible range, the oxidation apparatus comprising:

an apparatus inlet port configured to receive the continuous gas stream;

a heat exchanger in fluid communication with the apparatus inlet port, the heat exchanger comprising:
  a cold gas channel in fluid communication with the apparatus inlet port; and
  a hot gas channel in thermal communication with the cold gas channel;

a reactor inlet port in fluid communication with the cold gas channel;

a reactor body in fluid communication with the reactor inlet port, wherein the reactor body has a first, smaller flow area and a second, larger flow area;

a reactor outlet port in fluid communication with the reactor body and the hot gas channel of the heat exchanger; and an apparatus outlet port in fluid communication with the hot gas channel, wherein the apparatus outlet port is configured to emit the continuous gas stream from the oxidation apparatus;

wherein the oxidation apparatus is configured to provide the continuous gas stream with heating to achieve gradual oxidation of the fuel gas, whereby the gradual oxidation of the fuel gas raises the temperature of the continuous gas stream, thus increasing the oxidation rate of the fuel gas and further increasing the temperature of the continuous gas stream; such that heat is transferred from higher temperature gas travelling through the hot gas channel to lower temperature gas travelling through the cold gas channel, raising the temperature of the lower temperature gas travelling through the cold gas channel to initiate and maintain gradual oxidation of the fuel gas, to facilitate substantial oxidation of the fuel gas of the continuous gas stream within the oxidation apparatus.

5. The oxidation apparatus of claim 4, wherein the fuel gas comprises at least one material selected from a group consisting of: methane; hydrocarbon compounds; hydrogen; carbon monoxide; and ammonia.

6. The oxidation apparatus of claim 4, wherein the fuel gas is generated as a byproduct of a separate process.

7. The oxidation apparatus of claim 6, wherein the gradual oxidation of the fuel gas is controlled and maintained by providing additional fuel gas to the oxidation apparatus.

8. The oxidation apparatus of claim 4, wherein the reactor body is configured to be preheated prior to receiving the continuous gas stream.

9. The oxidation apparatus of claim 4, wherein the reactor body is made from metal.

10. The oxidation apparatus of claim 4, wherein the reactor body is made from a ceramic material.

11. The oxidation apparatus of claim 4, wherein the reactor body is made from composite materials.

12. The oxidation apparatus of claim 4, wherein the reactor body is a coiled reactor body.

13. The oxidation apparatus of claim 4, wherein the reactor body is a forked reactor body.

14. The oxidation apparatus of claim 4, wherein the reactor body is a serpentine reactor body.

15. The oxidation apparatus of claim 4, wherein the carrier gas is air.

16. The oxidation apparatus of claim 4, further comprising a soaker channel, wherein the soaker channel is disposed between and in fluid communication with the reactor outlet port and the hot gas channel.

17. An oxidation apparatus configured to receive an input gas stream and emit an output gas stream, the input gas stream having a fuel gas mixed with a carrier gas, the carrier gas comprising oxygen, wherein the concentration of fuel gas within the input gas stream is below a combustible range, the oxidation apparatus comprising:

a heat exchanger configured to receive the input gas stream and transfer heat from the output gas stream to the input gas stream to raise the temperature of the input gas stream;

a reactor body in fluid communication with the heat exchanger, wherein the reactor body is configured receive the input gas stream from the heat exchanger, substantially oxidize the fuel gas within the input gas stream to form the output gas stream and emit the output gas stream to the heat exchanger; and a soaker channel, wherein the soaker channel is disposed between and in fluid communication with the reactor body and the heat exchanger;

wherein the oxidation apparatus is configured to provide the input gas stream with heating to achieve gradual oxidation of the fuel gas, whereby the gradual oxidation of the fuel gas raises the temperature of the input gas stream, thus increasing the oxidation rate and increasing the temperature of the input gas stream within the oxidation apparatus to initiate and maintain gradual oxidation of the fuel gas, to facilitate substantial oxidation of the fuel gas within the oxidation apparatus.

18. The oxidation apparatus of claim 17, wherein the reactor body is a serpentine reactor body.

* * * * *